United States Patent [19]

Okawa

[11] Patent Number: 5,169,920
[45] Date of Patent: Dec. 8, 1992

[54] METHOD FOR PREPARING DIPHENYLSILOXANE/DIMETHYLSILOXANE COPOLYMERS

[75] Inventor: Tadashi Okawa, Chiba, Japan

[73] Assignee: Dow Corning Toray Silicone Co., Ltd, Tokyo, Japan

[21] Appl. No.: 687,352

[22] Filed: Apr. 18, 1991

[30] Foreign Application Priority Data

Apr. 28, 1990 [JP] Japan .................. 2-114177

[51] Int. Cl.⁵ .............................. C08G 77/04
[52] U.S. Cl. ........................ 528/34; 528/33; 528/37; 528/43
[58] Field of Search ............. 528/37, 43, 33, 34

[56] References Cited

U.S. PATENT DOCUMENTS

| | | | |
|---|---|---|---|
| 3,337,497 | 8/1967 | Bostick .................. | 260/46.5 |
| 3,578,726 | 3/1971 | Bostick et al. ............ | 260/825 |
| 4,317,899 | 3/1982 | Bluestein et al. ......... | 528/37 |
| 4,807,341 | 4/1989 | Nielsen et al. ........... | 29/132 |
| 5,045,621 | 9/1991 | Suzuki ................... | 528/14 |
| 5,079,291 | 1/1992 | Evans .................... | 528/37 |

*Primary Examiner*—Melvyn I. Marquis
*Attorney, Agent, or Firm*—Robert Spector

[57] ABSTRACT

The molecular weight of diphenylsiloxane-dimethylsiloxane copolymers can be controlled and the desired copolymers obtained in high yield when mixtures of hexaphenylcyclotrisiloxane and hexamethylcyclotrisiloxane are polymerized in a suitable aprotic solvent using a specified class of lithium silanolates as the polymerization initiator and a low molecular weight silanol-terminated polydiorganosiloxane as a molecular weight regulator, and the polymerization reaction is terminated when from 85 to 100 percent of the cyclosiloxanes are converted to said copolymer and prior to any substantial equilibration of the copolymer.

4 Claims, No Drawings

METHOD FOR PREPARING DIPHENYLSILOXANE/DIMETHYLSILOXANE COPOLYMERS

BACKGROUND OF THE INVENTION

1. Field of the Invention

This invention relates to a novel method for the preparation of diphenylsiloxane-dimethylsiloxane copolymers. More particularly, this invention relates to a method for preparing diphenylsiloxane/dimethylsiloxane copolymers without generating substantial amounts of cyclic organosiloxanes or undesirably high molecular weight polymers.

2. Background Information

It is known to prepare diphenylsiloxane-dimethylsiloxane copolymers by the polymerization of mixtures containing hexaphenyltrisiloxane and hexamethylcyclotrisiloxane in the presence of lithium compounds, including the hydroxide and silanolates, as polymerization catalysts. The preparation of block copolymers by the sequential addition of these cyclosiloxanes to a reaction mixture containing lithium silanolates or complexes of these silanolates is described in U.S. Pat. Nos. 3,578,726 and 3,337,497, which issued to Bostic.

Polymerization of a mixture of cyclic dimethyl- and diphenylsiloxanes in the proportion required to prepare a copolymer using a silanolate such as potassium trimethylsilanolate is taught in U.S. Pat. No. 4,807,341, which issued to Nielsen.

The disadvantages inherent in these previously described preparative methods include low yields of the desired copolymer due to the production of large amounts of cyclic organosiloxanes when the initially formed polymers are allowed to equilibrate. The quantity of these cyclic organosiloxanes makes it difficult to control the molecular weight of the desired polymer. In this type of polymerization the molecular weight must be controlled empirically by adjusting the quantity of reactant used to form the terminal groups of the polymer molecule.

When water or a low alpha, omega-dihydroxy-terminated oligomeric diorganosiloxane is used as the endblocking agent to obtain a copolymer terminated by a silanol group at both molecular-chain terminals, these silanol groups can react with one another with the resultant elimination of water and formation of a siloxane (Si—O—Si) bond. Under these conditions the molecular weight of the copolymer will far exceed the desired value.

One objective of the present invention is to provide a method for the preparation of diphenylsiloxane-dimethylsiloxane copolymer which provides the copolymer in high yields and in the desired molecular weight range.

SUMMARY OF THE INVENTION

The present inventor discovered that by using a specified class of lithium silanolates as the polymerization initiator and a low molecular weight silanol-terminated polydiorganosiloxane as a molecular weight regulator diphenylsiloxane-dimethylsiloxane copolymers of the desired molecular weight can be obtained in high yield when mixtures of hexaphenylcyclotrisiloxane and hexamethylcyclotrisiloxane are polymerized in a suitable solvent and the reaction is terminated before equilibration of the resultant copolymer occurs.

The present inventor also discovered that the copolymer's molecular weight can be easily regulated by controlling the total quantities of polymerization initiator and molecular weight regulator and the relative concentrations of these two materials.

DETAILED DESCRIPTION OF THE INVENTION

This invention provides an improved method for the preparation of a diphenylsiloxane-dimethylsiloxane copolymer, said method comprising the steps of
maintaining a reaction mixture comprising (a) a mixture of cyclotrisiloxanes consisting essentially of hexamethylcyclotrisiloxane and hexaphenylcyclotrisiloxane and, as the polymerization initiator, and (b) a lithium silanolate represented by the formula $$\text{LiO}(R^1{}_2\text{SiO})_l\text{Li}$$

under the conditions required to polymerize said cyclotrisiloxanes, where $R^1$ represents a monovalent hydrocarbon radical and l represents an integer having a value of at least 1, and subsequently terminating the polymerization by adding a neutralizing agent to said reaction mixture.

The improvement that characterizes the present method comprises
1) the presence in said reaction mixture of a suitable aprotic solvent and a molecular weight regulator of the formula $$\text{HO}(R^2{}_2\text{SiO})_m\text{H}$$

where $R^2$ represents a monovalent hydrocarbon radical, m is zero or an integer with a value of at least 1, and the molar ratio of said polymerization initiator to said regulator is from 100:0.1 to 0.1:100, and
2) terminating the polymerization when from 80 to 100% of said cyclotrisiloxanes have been converted to said copolymer and prior to any substantial equilibration of said copolymer.

The steps of the present method will now be explained in detail.

The Polymerization Initiator

In accordance with the first step of the present method, polymerization of a mixture of hexaphenylcyclotrisiloxane and hexamethylcyclotrisiloxane in a suitable aprotic solvent is initiated by a lithium silanolate of the formula $$\text{LiO}(R^1{}_2\text{SiO})_l\text{Li}$$

The group $R^1$ in this formula represents a monovalent hydrocarbon radical exemplified by but not limited to alkyl radicals such as methyl, ethyl, propyl and butyl; aryl radicals such as phenyl, tolyl, and xylyl; aralkyl radicals such as benzyl and phenethyl; and alkenyl radicals such as vinyl, allyl, butenyl and hexenyl. Among these radicals, methyl, phenyl, and vinyl are preferred from the standpoints of ease of preparation and economics.

While l of the formula for the lithium silanolate must be an integer with a value of at least 1, values of at least 2 are preferred except when $R^1$ represents an aryl radical. This preference is based on the ease of preparing these compounds. Methods for preparing lithium silanolates are known, and include but are not limited to reaction of an organosilanediol or an alpha,omega-dihydroxyorganopolysiloxane with lithium metal or with lithium compounds such as lithium hydroxide and alkyl-lithiums such as butyllithium.

The concentration of lithium silanolate should be sufficient to initiate the ring-opening polymerization of the mixture of hexamethylcyclotrisiloxane and hexaphenyl-cyclotrisiloxane. More specifically, the ratio of the total number of moles of hexamethylcyclotrisiloxane plus hexaphenylcyclotrisiloxane to the number of moles of lithium silanolate preferably falls within the range of 1:1 to 2,000:1.

The molar ratio between the lithium silanolate and the molecular weight regulator, which can be water when m of the formula from this ingredient is 0 or a silanol-terminated oligomeric diorganosiloxane when m is at least 1, can be from 100:0.1 to 0.1 to 100. Excellent polymerization rates are obtained when this ratio is from 100:0.1 to 0.5:99.5.

The molar ratio between the hexamethylcyclotrisiloxane and hexaphenylcyclotrisiloxane is not critical. Nevertheless, when the concentration of hexaphenylcyclotrisiloxane reaches excessively high levels, there is an increase in the quantity of unreacted hexaphenylcyclotrisiloxane and the quantity of siloxane cyclics produced by side reactions. Under these conditions it becomes difficult to obtain copolymer with compositional ratios that conform to the initial relative concentration of the two monomers. The yield of copolymer also tends to decline. For these reasons, it is preferable that the hexaphenylcyclotrisiloxane not exceed 50 mole % of the total monomers.

In accordance with the present method, polymerization of the two cyclotrisiloxanes is conducted in an aprotic solvent at a temperature not exceeding the solvent's boiling point. The reaction time is ordinarily 1 to 50 hours. Examples of recommended solvents include but are not limited to are aromatic hydrocarbons such as benzene, toluene, and xylene; ethers such as tetrahydrofuran and diethyl ether; aliphatic hydrocarbons such as hexane and heptane; ketones such as acetone and methyl ethyl ketone; esters such as ethyl acetate and butyl acetate; and other classes of solvents represented by dimethylformamide, dimethyl sulfoxide, and hexamethylphosphoric acid triamide.

Good results are often obtained by using combinations of two or more of these suitable solvents, particularly solvents of different polarities. For example, relatively non-polar solvents such as toluene are preferably used in combination with a highly polar solvent such as dimethylformamide, dimethyl sulfoxide or hexamethylphosphoric acid triamide in order to accelerate the polymerization reaction.

Among the polymerization conditions, attention must be directed at controlling the reaction temperature and time in order to minimize the occurrence of redistribution reactions. While the reaction temperature must not exceed the boiling point of the solvent used, the temperature preferably does not exceed 60 degrees Centigrade in order to minimize redistribution reactions.

On the other hand, the reaction temperature should be at least 20 degrees Centigrade in order to obtain good polymerization rates.

With regard to the polymerization reaction itself, the conversion of the hexamethylcyclotrisiloxane is monitored, typically by techniques such as gas chromatography and gel permeation chromatography. The polymerization reaction must be stopped by a neutralization step when the required conversion of hexamethylcyclotrisiloxane to copolymer is achieved. This conversion should be from 80 to 100% and is preferably from 90 to 100%. If the conversion reaches 100% and the polymerization is allowed to continue, the molecular weight distribution, also referred to as dispersity, of the copolymer product will be broadened due to redistribution reactions and the quantity of cyclic siloxane produced as a by-product of the polymerization will be increased. For this reason, the polymerization reaction must be promptly terminated by a neutralization step no later than when the conversion reaches 100%.

In accordance with the present method, the molecular weight of the diphenylsiloxane-dimethylsiloxane copolymer product is determined by the ratio between polymerization initiator and the amount of monomer consumed. Because the silanol group undergoes an extremely rapid exchange reaction with lithium silanolate, the molecular weight regulator can be added to the initial reaction mixture as the silanol-containing organosilane or organopolysiloxane precursor of the lithium silanolate used as the polymerization initiator.

Alternatively, the molecular-weight regulator may consist of unreacted silanol-terminated organosilane or organopolysiloxane from the reaction mixture used to prepare the polymerization initiator. The concentration of unreacted organosilane or organopolysiloxane can be increased by reducing the number of moles of lithium metal compound below the number of moles of silanol group in the reaction which generates the polymerization initiator.

As another alternative method for generating the molecular weight regulator, water or a diorganopolysiloxane containing a silanol group at the two terminal positions of the molecule can be added to the polymerization reaction mixture irrespective of the starting material for the polymerization initiator.

The group $R^2$ in the preceding formula for the molecular weight regulator is selected from same group of hydrocarbon and substituted hydrocarbon radicals represented by $R^1$ in the formula of the lithium silanolate used as the polymerization initiator. The subscript m in the formula for the molecular weight regulator is zero or a positive integer.

It should be apparent that the molecular weight regulator is water when m=zero. When m is not zero, the value of m is preferably at least 2, except when $R^1$ is an aryl group. The preference is based on the ease of preparation and stability of the silanol.

The neutralizing agent used to terminate this polymerization should react with lithium silanolate to form a stable lithium metal salt. Examples of suitable neutralizing agents include but are not limited to carbonic acid; mineral acids such as hydrochloric acid, and sulfuric acid; carboxylic acids such as acetic acid, propionic acid, and acrylic acid; and chlorosilanes such as trimethylchlorosilane, dimethylchlorosilane, dimethylphenylchlorosilane, and dimethylvinylchlorosilane.

The terminal positions of the dimethylsiloxane-diphenylsiloxane copolymer will contain the silanol group when the polymerization is stopped with carbonic acid, mineral acid, or a carboxylic acid. In the case of termination with chlorosilane, the organosilyl group remaining following reaction of the chlorosilane becomes the terminal group of the polymer molecule. Thus, termination with an acid as specified above should be used when the objective is a diphenylsiloxane-dimethylsiloxane copolymer having the silanol group at both molecular-chain terminals.

When the final copolymer is to be terminated with silicon-bonded functional groups, termination should be accomplished using a chlorosilane carrying these functional groups. Alternatively, functional groups can also be introduced into a silanol-terminated copolymer obtained by acid termination through the further addition of any of various chlorosilanes and the execution of a dehydrochlorination reaction. The use of a hydrochloric acid acceptor, such as an amine and so forth, is recommended in such a step.

Use of dimethylchlorosilane as the chlorosilane will yield a diphenylsiloxane-dimethylsiloxane copolymer containing silicon-bonded hydrogen atoms at both terminal positions of the copolymer molecule. This type of copolymer can then be reacted with an compound containing an aliphatically unsaturated group such as a vinyl radical together with additional functional groups that do not participate in the hydrosilylation reaction to yield a copolymer containing these additional functional groups.

EXAMPLES

The following examples illustrate preferred embodiments of the present method, and should not be interpreted as limiting the scope of this invention as defined in the accompanying claims. Unless otherwise specified, all parts in the examples are by weight, viscosities are measured at 25° C., Me=methyl and Ph=phenyl.

COMPARISON EXAMPLE 1

The following ingredients were introduced into a four-neck flask: 59.5 g (200.7 millimoles) octamethylcyclotetrasiloxane, 140.5 g (236.15 millimoles) hexaphenylcyclotrisiloxane, 63.2 g (83.6 millimoles) of an dimethylsiloxane oligomer with the average formula $Me_3SiO(Me_2SiO)_8SiMe_3$ and, as the polymerization initiator, an amount of potassium hydroxide equivalent to 650 ppm potassium based on the reaction mixture. After stirring for 2.5 hours with heating at 190 degrees Centigrade and then cooling, trimethylchlorosilane was added in order to terminate the polymerization.

The reaction mixture was concentrated by removal of low boiling materials at a temperature of 180° C. under a pressure of 3 mm Hg to yield a final reaction mixture containing a diphenylsiloxane-dimethylsiloxane copolymer. This final reaction mixture was analyzed by gel permeation chromatography (GPC) using tetrahydrofuran and the solvent and ultraviolet light as the detector. The yield of diphenylsiloxane-dimethylsiloxane copolymer as determined by gas liquid chromatography (GLC) was 70%, and the residue consisted of cyclic siloxane by-products that were not removed during the concentration step.

The final diphenylsiloxane-dimethylsiloxane copolymer had a number-average molecular weight, using a polystyrene standard of 2,678, compared with a theoretical value of 3,143, and its dispersity was 1.56.

COMPARISON EXAMPLE 2

The following ingredients were introduced into a four-neck flask and heated at 35 degrees Centigrade with stirring: 0.175 g potassium silanolate with the formula $KO(Me_2SiO)_nK$ and a neutralization equivalent=1,655, 0.152 g water (8.43 millimoles), 20 g hexamethylcyclotrisiloxane (89.9 millimoles), 13.4 g hexaphenylcyclotrisiloxane (22.5 millimoles), and 30 mL tetrahydrofuran. The reaction was monitored by gas chromatography (GLC). After 5 hours, when the hexamethylcyclotrisiloxane conversion had reached 97%, the polymerization was stopped by the addition of 0.02 g acetic acid.

Filtration and removal of the tetrahydrofuran under reduced pressure yielded a diphenylsiloxane-dimethylsiloxane copolymer reaction mixture.

This reaction mixture was submitted to analysis by GPC with the following results: the yield of diphenylsiloxane-dimethylsiloxane copolymer was 62%, and the residue consisted of siloxane cyclics. In addition, this diphenylsiloxane-dimethylsiloxane copolymer had a number-average molecular weight of 5,113 (calculated value=3,899) and a dispersity of 1.27.

EXAMPLE 1

2.6 Grams (8.43 millimoles) of an oligomeric polydimethylsiloxane with the average formula $HO(Me_2SiO)_{3.9}H$ was introduced into a four-neck flask, followed by the introduction, under a dry nitrogen blanket with stirring, of n-butyllithium (15.2 millimoles) dissolved in n-hexane. The completion of this addition was immediately followed by the addition of 17.5 g (78.9 millimoles) hexamethylcyclotrisiloxane, 13.4 g (22.5 millimoles) hexaphenylcyclotrisiloxane, and 30 mL tetrahydrofuran.

This reaction mixture was then stirred for 4 hours with heating to 40 degrees Centigrade, at which point the hexamethylcyclotrisiloxane conversion (monitored by GLC) was 99%. The polymerization was stopped at this point by addition of 1.1 g acetic acid. The resultant reaction mixture was filtered and the tetrahydrofuran was then removed under reduce pressure to yield a diphenylsiloxane-dimethylsiloxane copolymer reaction mixture. This reaction mixture was analyzed by GPC with the following results: the yield of diphenylsiloxane-dimethylsiloxane copolymer was 89%, and the residue consisted of siloxane cyclics. In addition, this diphenylsiloxane-dimethylsiloxane copolymer had a number-average molecular weight of 3,803 (calculated value=3,946), and its dispersity was 1.24.

EXAMPLE 2

5.2 Grams (16.9 millimoles) of an oligomeric dimethylsiloxane with the average formula $HO(Me_2SiO)_{3.9}H$ was charged to a four-neck flask, followed by the introduction, under a dry nitrogen blanket with stirring, of n-butyllithium (30.3 millimoles) dissolved in n-hexane. The completion of this addition was immediately followed by the addition of 5.1 g (22.9 millimoles) hexamethylcyclotrisiloxane, 6.7 g (11.2 millimoles) hexaphenylcyclotrisiloxane, and 15 cc tetrahydrofuran.

This reaction mixture was then stirred for 1 hour at room temperature, for 1 hour with heating at 30 degrees Centigrade, and finally for 2.5 hours with heating at 40 degrees Centigrade in order to develop the polymerization reaction. At this point, analysis of the reaction mixture using GLC showed that the hexamethylcyclotrisiloxane conversion had reached 95%. At this point the polymerization was terminated by the addition of 2.2 g of acetic acid.

Filtration of the reaction mixture and removal of the tetrahydrofuran under reduced pressure yielded a final reaction mixture containing a diphenylsiloxane-dimethylsiloxane copolymer. This final reaction mixture was analyzed by GPC with the following results: the diphenylsiloxane-dimethylsiloxane copolymer had a number-average molecular weight of 1,101, compared with a calculated value of 976, a dispersity of 1.41, and a yield of the desired copolymer of this invention of 85%.

EXAMPLE 3

2.6 Grams 8.4 millimoles of an oligomeric silanol-terminated dimethylsiloxane with the average formula HO(Me$_2$SiO)$_{3.9}$H was first introduced into a four-neck flask, followed by the introduction, under a dry nitrogen blanket with stirring, of n-butyllithium (3.4 millimoles) dissolved in n-hexane. The completion of this addition was immediately followed by the addition of 17.5 g (78.9 millimoles) hexamethylcyclotrisiloxane, 13.4 g (22.5 millimoles) hexaphenylcyclotrisiloxane, and 30 mL tetrahydrofuran. After this mixture had been stirred for 5 hours with heating at 40 degrees Centigrade, the hexamethylcyclotrisiloxane conversion (monitored by GLC) was 99.2%, and polymerization was halted by the addition of 0.4 g acetic acid. Filtration and removal of the tetrahydrofuran in vacuo afforded a diphenylsiloxane-dimethylsiloxane copolymer reaction mixture. This reaction mixture was analyzed by GPC with the following results: the yield of diphenylsiloxane-dimethylsiloxane copolymer was 90%, and the residue consisted of siloxane cyclics.

This diphenylsiloxane-dimethylsiloxane copolymer had a number-average molecular weight of 5,644 (calculated value=3,951), and it had a dispersity of 1.21.

EXAMPLE 4

2.6 Grams (8.4 millimoles) of an oligomeric polydimethylsiloxane with the average formula HO(Me$_2$SiO)$_{3.9}$H was introduced into a four-neck flask as the molecular weight regulator, followed by the introduction, under a dry nitrogen blanket with stirring, of n-butyllithium (3.4 millimoles) dissolved in n-hexane. Completion of this addition was immediately followed by the addition of 12.5 g (56.4 millimoles) of hexamethylcyclotrisiloxane, 26.7 g (45.0 millimoles) of hexaphenylcyclotrisiloxane, and 30 mL tetrahydrofuran. After stirring for 4.5 hours with heating at 40 degrees Centigrade and for 3.5 hours with heating at 50 degrees Centigrade, the hexamethylcyclotrisiloxane conversion was 99.5% by GLC. At this point the polymerization was terminated by the addition of 0.4 g acetic acid.

Filtration and removal of the tetrahydrofuran under reduced pressure yielded a final reaction mixture containing diphenylsiloxane-dimethylsiloxane copolymer. Analysis using GPC indicated that this copolymer was obtained in a yield of 90%, the number-average molecular weight was 5,850, compared with a calculated value=4,953, and its dispersity was 1.20.

EXAMPLE 5

2.6 Grams (8.4 millimoles) of a silanol-terminated oligomeric dimethylsiloxane with the average formula HO(Me$_2$SiO)$_{3.9}$H was first introduced into a four-neck flask, followed by the introduction, under a dry nitrogen blanket with stirring, of n-butyllithium (3.4 millimoles) dissolved in n-hexane. The completion of this addition was immediately followed by the addition of 17.5 g (78.9 millimoles) hexamethylcyclotrisiloxane, 13.4 g (22.5 millimoles) hexaphenylcyclotrisiloxane, and 30 mL tetrahydrofuran. After stirring for 2 hours with heating at 50 degrees Centigrade, the hexamethylcyclotrisiloxane conversion, determined by GLC, was 99.5%, at which point the polymerization was terminated by the addition of 0.4 g acetic acid to the reaction mixture. Filtration and removal of the solvent in vacuo yielded a diphenylsiloxane-dimethylsiloxane copolymer. Analysis by GPC indicated the yield of copolymer to be 92%, a number-average molecular weight of 5,740, compared with a calculated value of 3,958, and a dispersity of 1.22.

EXAMPLE 6

2.9 Grams (9.4 millimoles) of an oligomeric dimethylsiloxane with the average formula HO(Me$_2$SiO)$_{3.9}$H was first introduced into a four-neck flask as the molecular weight regulator, followed by the introduction, under a dry nitrogen blanket with stirring, of n-butyllithium (15.6 millimoles) dissolved in n-hexane. The lithium compound reacted with a portion of the dimethylsiloxane to form a polymerization initiator of this invention. The completion of this addition was immediately followed by the addition of 90 g (404.6 millimoles) hexamethylcyclotrisiloxane, 62.0 g (104.2 millimoles) hexaphenylcyclotrisiloxane, 0.54 g water (29.7 millimoles) as an additional molecular weight regulator, and 150 cc tetrahydrofuran as the aprotic solvent. After stirring the resultant mixture for 5.5 hours with heating at 40 degrees Centigrade, analysis of the reaction mixture by GLC indicated a hexamethylcyclotrisiloxane conversion of 99.7%. The polymerization was then terminated by the addition of 0.4 g acetic acid.

Filtration of the reaction and removal of the tetrahydrofuran from the liquid phase under reduced pressure yielded a diphenylsiloxane-dimethylsiloxane copolymer. Analysis by GPC indicated that the desired copolymer was obtained in a yield of 88%, its number-average molecular weight was 5,112, compared with a calculated value of 3,963, and its dispersity was 1.21.

119.1 Grams of this diphenylsiloxane-dimethylsiloxane copolymer, 11.2 g (110.2 millimoles) triethylamine, and 100 cc toluene were then placed in a four-neck flask. 7.0 Grams (73.5 millimoles) dimethylchlorosilane was then added dropwise while cooling the reactor with water. Upon conclusion of this addition, stirring was continued at room temperature for 2 hours, followed by filtration of the reaction to remove the salt by-product and removal of the toluene from the liquid phase under reduced pressure. The reaction product was a dimethylhydrogensiloxy-terminated diphenylsiloxane-dimethylsiloxane copolymer. Analysis of the copolymer using GPC indicated a number-average molecular weight of 5,178 compared with a calculated value of 4,079, and a dispersity of 1.22. Nuclear magnetic resonance analysis (NMR) confirmed that the absence of terminal silanol groups and that this copolymer was a diphenylsiloxane-dimethylsiloxane copolymer wherein 100% of the terminal groups were dimethylhydrogensiloxy.

EXAMPLE 7

39.1 Grams (126.5 millimoles) of an oligomeric dimethylsiloxane with the average formula HO(Me$_2$SiO)$_{3.9}$H was charged into a four-neck flask, followed by the introduction, under a dry nitrogen blanket with stirring, of n-butyllithium (227.6 millimoles) dissolved in n-hexane. The completion of this addition was immediately followed by the addition of 319.5 g (1436.1 millimoles) hexamethylcyclotrisiloxane, 125.4 g (210.75 millimoles) hexaphenylcyclotrisiloxane, and 450 mL tetrahydrofuran. After stirring for 3.5 hours with heating at 40 degrees Centigrade, the hexamethylcyclotrisiloxane conversion was 99% by GLC, at which time polymerization was terminated by the addition of 10.24 g (101.2 millimoles) of triethylamine and 28.7 g (303.5 millimoles) of dimethylchlorosilane. Filtration and removal of the tetrahydrofuran from the liquid phase under reduced pressure yielded a final reaction mixture containing a diphenylsiloxane-dimethylsiloxane copolymer. Analysis of this reaction mixture using GPC indicated a 91% yield of a exhibiting a number-average molecular weight of 3,997 compared with a calculated value of 3,918, and a dispersity of 1.26.

That which is claimed is:

1. In a method for the preparation of a diphenylsiloxane-dimethylsiloxane copolymer, said method comprising the steps of reacting a mixture comprising a blend of hexamethylcyclotrisiloxane and hexaphenylcyclotrisiloxane and, as the polymerization initiator, a lithium silanolate represented by the formula $$LiO(R^1{}_2SiO)_l Li$$

under the conditions required to polymerize said cyclotrisiloxanes, where $R^1$ represents a monovalent hydrocarbon radical and $l$ represents an integer having a value of at least 1, and then terminating the polymerization by neutralization of said initiator, the improvement comprising (1) the presence in said reaction mixture of an aprotic solvent and a molecular weight regulator of the formula $$HO(R^2{}_2SiO)_m H$$

where $R^2$ represents a monovalent hydrocarbon radical, m is zero or an integer with a value of at least 1, and the molar ratio of said polymerization initiator to said regulator is from 100:0.1 to 0.1:100, (2) maintaining said mixture at a temperature of from 20° to 60° C. during said polymerization and (3) terminating said polymerization when the conversion of said cyclotrisiloxanes to said copolymer has reached from 80 to 100% and prior to any substantial equilibration of said copolymer.

2. A method according to claim 1 where said hexaphenyltrisiloxane constitutes up to 50 mole percent of said cyclotrisiloxanes, the molar ratio of total cyclotrisiloxanes to polymerization initiator is from 1:1 to 200:1, $R^1$ is methyl, phenyl or vinyl, the value of $l$ is at least 2 except when $R^1$ is phenyl, and said neutralizing agent is selected from the group consisting of carbonic acid, carboxylic acids, mineral acids, and chlorine-containing silanes.

3. A method according to claim 2 where said chlorosilanes contains at least one silicon-bonded hydrogen atom and said polymerization is conducted in a mixture of at least two aprotic solvents of differing polarity.

4. A copolymer prepared in accordance with the method of claim 1.

* * * * *